NONRECIPROCAL PARAMETRIC AMPLIFIER CONVERTER WITH INTERNAL PUMP

Original Filed Nov. 22, 1961 4 Sheets-Sheet 1

INVENTORS
Robert Maurer &
Karl-Heinz Löcherer
BY Spencer & Kaye
ATTORNEYS

INVENTORS
Robert Maurer &
Karl-Heinz Löcherer
BY Spencer & Kaye
ATTORNEYS

NONRECIPROCAL PARAMETRIC AMPLIFIER CONVERTER WITH INTERNAL PUMP

Original Filed Nov. 22, 1961 4 Sheets-Sheet 3

$$f_i = \begin{cases} f_p - f_s \text{ in the frequency inverting case} \\ f_p + f_s \text{ in the frequency non inverting case} \end{cases}$$

INVENTORS
Robert Maurer &
Karl-Heinz Löcherer
BY Spencer & Kaye
ATTORNEYS

INVENTORS
Robert Maurer &
Karl-Heinz Löcherer
BY Spencer & Kaye
ATTORNEYS 3,237,017

NONRECIPROCAL PARAMETRIC AMPLIFIER CONVERTER WITH INTERNAL PUMP

Robert Maurer and Karl-Heinz Locherer, Ulm (Danube), Germany, assignors to Telefunken Patentverwertungs-G.m.b.H., Ulm (Danube), Germany Continuation of applications Ser. Nos. 154,144 and 154,145, Nov. 22, 1961. This application Mar. 25, 1965, Ser. No. 442,691
Claims priority, application Germany, Nov. 22, 1960, T 19,310, T 19,311
9 Claims. (Cl. 307—88.3)

This application is a composite continuation of application Serial No. 154,144, filed November 22, 1961, and application Serial No. 154,145, filed November 22, 1961.

The present invention relates generally to amplifiers and more particularly to an amplifier of the non-reciprocal type.

Such amplifiers include the arrangement of a cascade connection of one up-converter and one down-converter, which may be parametric or tunnel diode mixers or converters. This type of circuit is especially suitable for use with ultra-high frequencies. Circuits of this general type are already known wherein a parametric down-converter is connected in tandem or cascade with a parametric up-converter. In order to obtain non-reciprocal behavior characteristics in such a circuit, the necessary pumping voltages are fed out of phase, and the effect of a three-armed circulator is achieved by means of two magic T's and an additional phase shifter. Such an arrangement, for example, can be found in Kamal, "Proceedings of the IRE," August 1960, pages 1424–1430.

This known type of circuit requires a relatively large volume and therefore can not be used in arrangements where an extremely small constructional volume or physical size is a requirement. Furthermore, a non-reciprocal parametric travelling wave amplifier is known wherein several reactance diodes are pumped with out of phase voltages so that amplification is provided in the forward direction, while in the reverse or backward direction the amplification is equal to one.

However, for certain applications of such a non-reciprocal amplifier device, attenuation must be provided in the reverse direction.

With these defects of the prior art in mind, it is a main object of the present invention to provide a non-reciprocal amplifier circuit which may be constructed to be of small physical size as compared to prior art arrangements.

Another object of the invention is to provide a converter cascade arrangement which always exhibits non-reciprocal behavior with respect to the magnitude of the transmitted signal by virtue of a compensating network which neutralizes the reactive admittance of the converter cascade.

A further objects of this invention is to prevent the radiation of undesirable and disturbing voltages over the antenna.

Another object of the invention is to provide an arrangement of the type described which prevents variations of the load admittance from having an effect on the input admittance of the amplifier and vice versa, by neutralizing the reactive admittance of the amplifier to achieve amplitude non-reciprocity over a broad bandwidth.

These objects and others ancillary thereto are accomplished according to embodiments of the invention wherein a non-reciprocal amplifier circuit especially adapted to ultra-high frequencies is constructed by means of a cascade connection of one up-converter and one down-converter, wherein the non-linear elements of these converters are modulated by a signal voltage and a pumping or oscillating voltage, respectively. One embodiment of the present invention uses, as the active element, a non-linear real conductance for one converter or mixer, and a non-linear susceptance for the other mixer or converter. With this type of cascade arrangement having one converter with a non-linear susceptance and a further converter with a non-linear real conductance, a non-reciprocal behavior characteristic will always be exhibited with respect to the magnitude of the transmitted signal. Also, with respect to phase, the cascade arrangement is non-reciprocal.

In another embodiment, these may include an up-converter and a down-converter having similar non-linear admittances, that is, both converters have the same type of admittance, a susceptance or conductance which is non-linear, and they are controlled throughout the range by pumping voltages which are out of phase. When such an amplifier device is to be used as the input circuit for television receivers the reactive admittance of the mixer or converter cascade is neutralized by using a linear passive and reciprocal coupling network between the amplifier elements, i.e., the mixers or converters. In this case, both amplifier elements will have either only non-linear susceptance or non-linear real conductance.

Additional objects and advantages of the present invention will become apparent upon consideration of the following description when taken in conjunction with the accompanying drawings in which.

Figures 1, 4A, 4B:
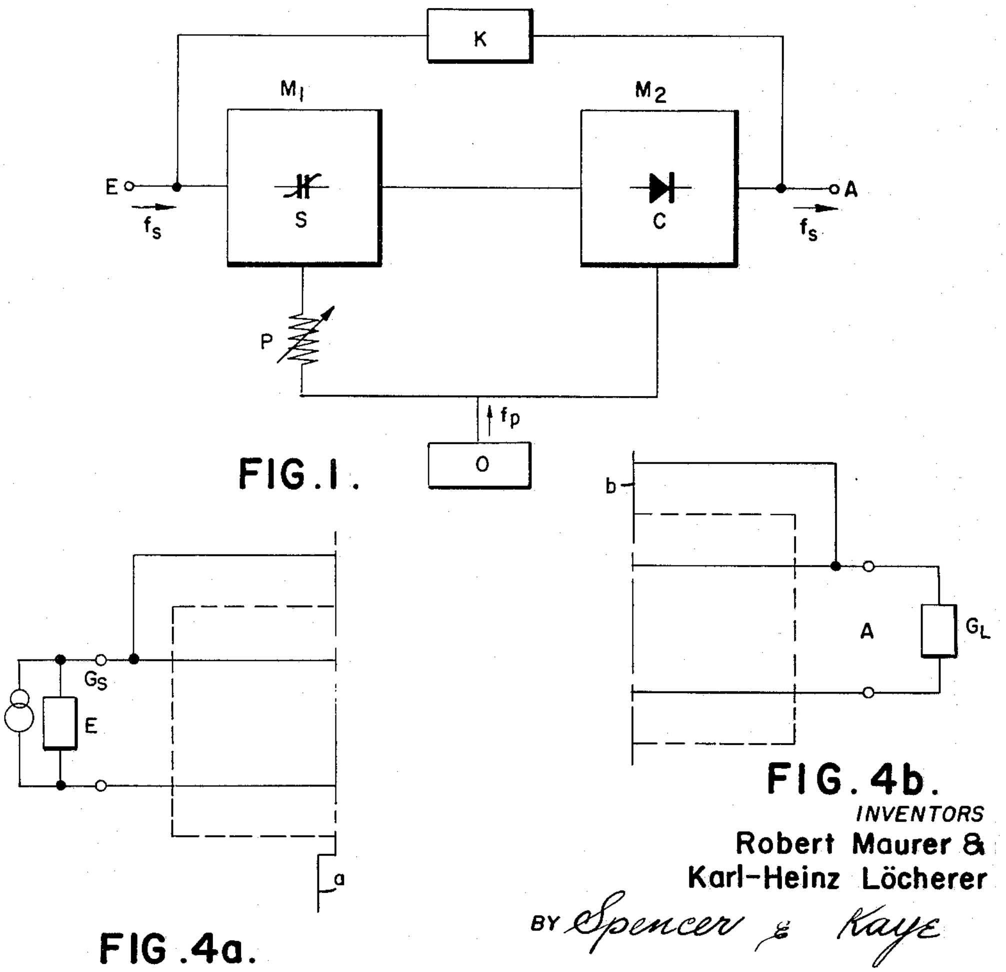
FIGURE 1 is a block diagram of an embodiment of the present invention with two mixers in cascade.
Figure 2:
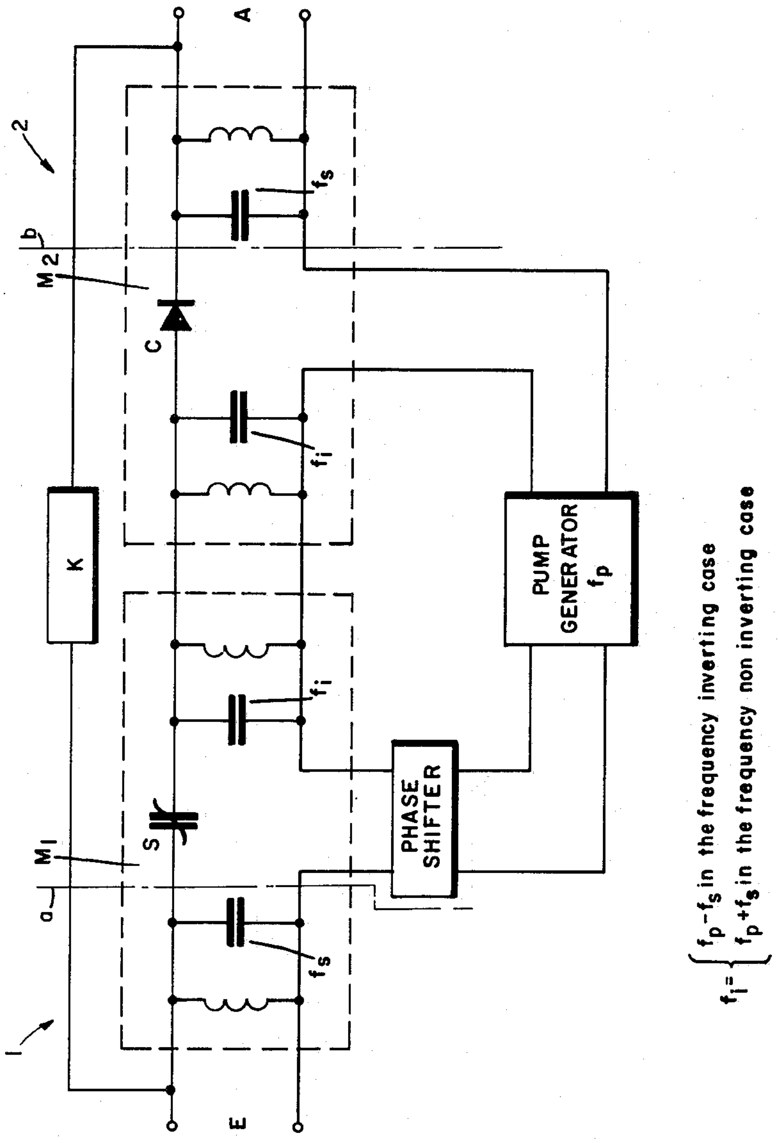
FIGURE 2 is a more detailed circuit diagram of the embodiment illustrated in FIGURE 1.

FIGURES 4*a* and 4*b* are alternative circuit diagrams showing an embodiment of the present invention wherein the internal impedances of the generator and load connected to the device are used instead of providing resonant circuits at the input and output of the device as shown, for instance, in FIGURE 2. The vertical lines *a* and *b* in FIGURES 4*a* and 4*b* are correlated with the lines *a* and *b* in FIGURE 2.

Figure 5:
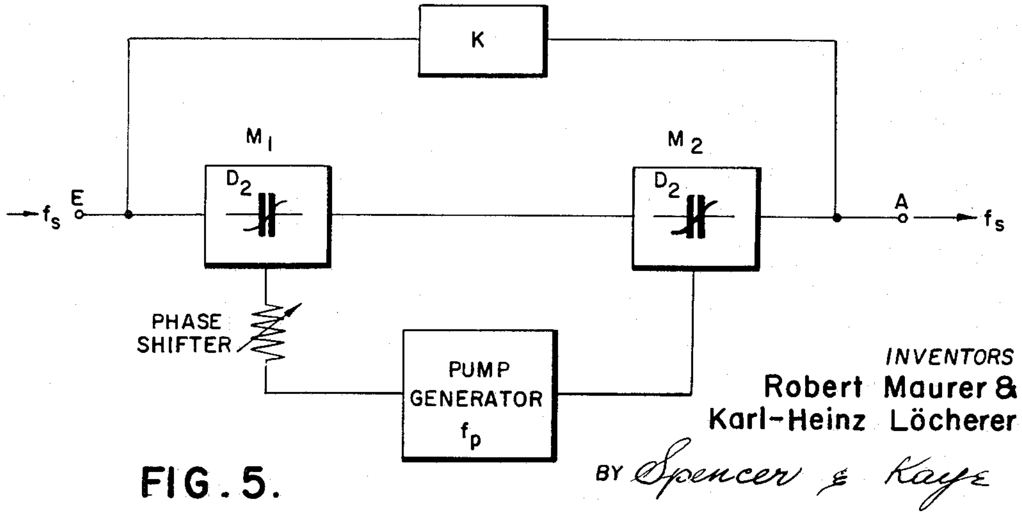

FIGURE 5 is a block diagram of another embodiment of the present invention with two mixers in cascade.

Figure 6:
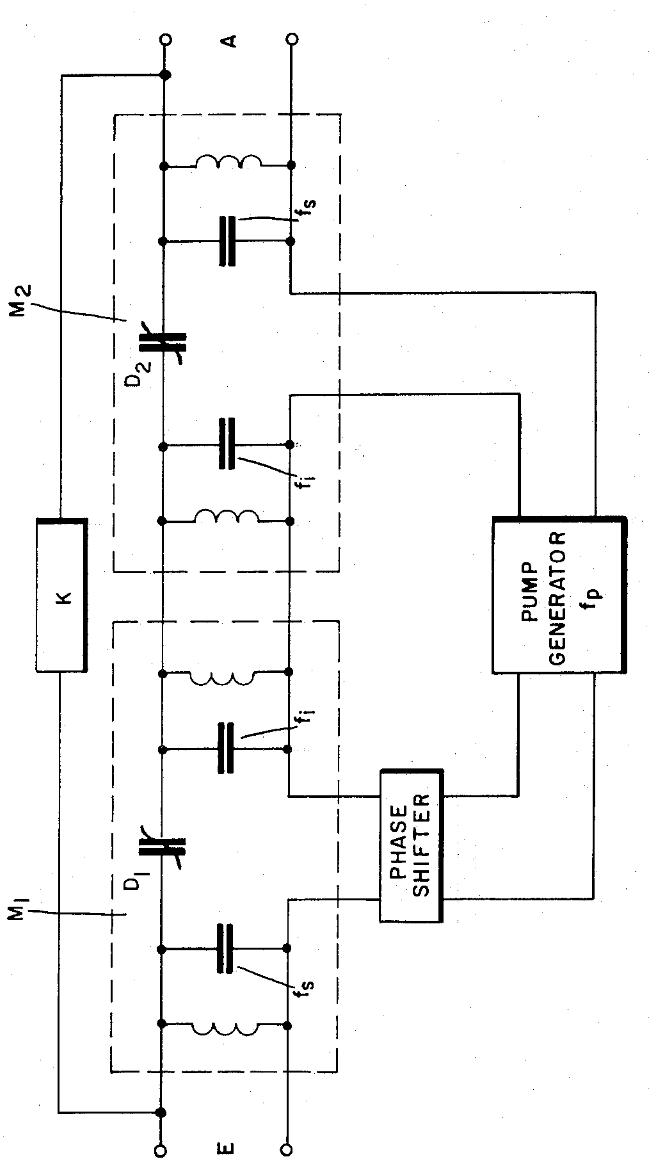

FIGURE 6 is a more detailed circuit diagram of the embodiment illustrated in FIGURE 5.

Figure 7:
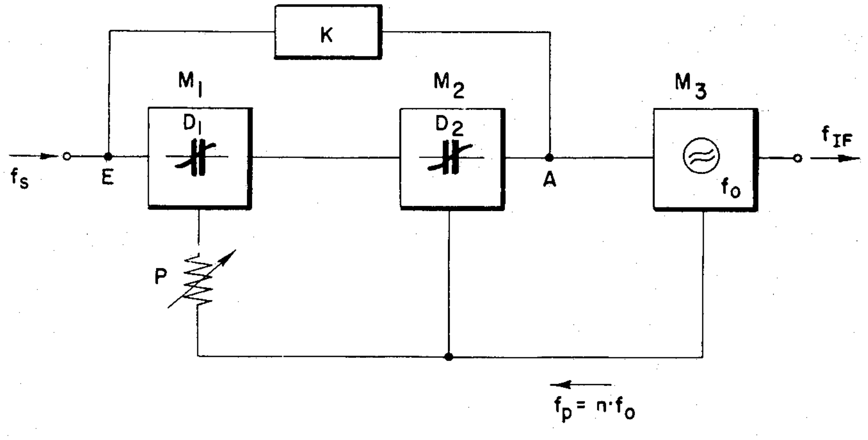

FIGURE 7 is a block diagram of an embodiment of the present invention based on that of FIGURE 5, with three mixers or converters in cascade.

With more particular reference to FIGURE 1, the two converters or mixers $M_1$ and $M_2$ are connected in tandem or cascade. One is an up-converter and the other is a down-converter. This circuit is provided with an input E and an output A. One of the two converters is provided with a non-linear susceptance S while the other has a non-linear real conductance C. In the particular embodiment illustrated in FIGURE 1, the non-linear susceptance S is arranged in the first converter $M_1$.

The susceptance S is preferably provided by a capacitance diode since it has a non-linear charge-voltage characteristic curve. Instead of this capacitance diode, a current sensitive inductance or a pre-magnetized ferrite device may be used to provide the non-linear susceptance, since the current-magnetic flux characteristic curves of these elements are also non-linear. The non-linear real conductance C may be provided by a conventional type of mixer diode or by an Esaki diode, which is a tunnel diode whose current voltage characteristic curve has a partially descending slope.

For some purposes of application, a circuit is required having an input which is completely decoupled with respect to its output. Therefore, the present invention proposes to provide for the neutralization of the reactive admittance of the cascade arrangement by connecting a passive linear and reciprocal coupling network K between the input E and the output A of the circuit illustrated.

If the first converter is an up-converter and the second converter is provided with a tunnel diode, then a transducer gain or amplification larger than unity is possible. The two converters $M_1$ and $M_2$ are fed with a pumping frequency or oscillating frequency $f_p$ from an oscillator O. the feeding may be in phase, or, as has been indicated in the drawing, out of phase. If out of phase, then a phase shifting device $p$ is provided between the two converters. When the cascade arrangement is operated in the frequency noninverting case, wherein the idle frequency is equal to the sum of the signal frequency and pumping frequency, i.e., $f_i=f_s+f_p$, the neutralization mentioned hereinabove is accomplished by an inductance when there is resonance, if the two pumping voltages for the two converters are in phase. On the other hand, when the pumping voltages are in phase opposition, a capacitance is used for neutralization purposes.

Moreover, when the converter cascade arrangement illustrated in FIGURE 1 is operated in the frequency non-inverting case, power matching is possible between the input and the output. When it is operated in the inverting case and with the pumping voltages in phase, the neutralization may be provided by using an inductance. On the other hand, with the pumping voltages in phase opposition, a capacitance is used for neutralization purposes. The cascade arrangement illustrated may be operated in a reverse or inverse direction, i.e., the input E may be used as the output A and vice versa. In order to simplify the circuit it is advisable to provide a common resonant circuit for the idle frequency for the two converters, as shown in FIGURE 2.

Figure 3:
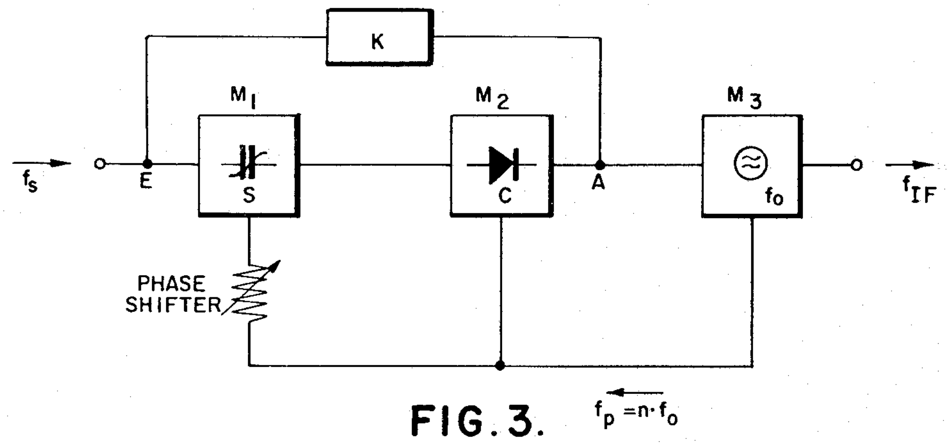
FIGURE 3 is a block diagram of an embodiment of the present invention based on that of FIGURE 1, with three mixers in cascade.

The circuit shown in FIGURES 1 and 2 may, according to the present invention, be extended to be a non-reciprocal mixer circuit by the addition of a further up-converter or down-converter, as shown in FIGURE 3. Such a mixer circuit is especially useful as the input circuit for ultra-high frequency and very high frequency tuners for television receivers. Such a circuit may be substantially decoupled in the reverse direction from output A to input E so that undesired radiation of the oscillator frequency over the antenna is eliminated by neutralizing the reactive admittance. When such a circuit is used for television receivers it is preferable to use a self-oscillating grounded-grid mixing stage as the third mixer or converter. The input circuit of a television receiver must, of course, be capable of being tuned through its operating range.

Usually, frequency sensitive resonant circuits are provided at the input E and at the output A of the cascade arrangement. Instead of using these resonant circuits, the real frequency independent inherent resistance $G_S$ of the signal generator which is the input, and the load $G_L$, may be used directly, as shown in FIGURES 4*a* and 4*b*. FIGURES 4*a* and 4*b* show circuitry replacing that indicated as 1 and 2, respectively, in FIGURE 2. In other words, the internal impedances of the generator and load connected to the device are used instead of providing resonant circuits at the input and output.

The above-described embodiments of the invention render it possible to design a non-reciprocal circuit in a simple manner and which exhibits the behavior of a so-called isolator in one direction, and which in spite of this renders it possible to have an amplification in the opposite direction.

It is to be noted that although an Esaki diode having a current-voltage characteristic curve with a partially descending slope may be used as the non-linear real conductance, a conventional mixer diode having a continuously ascending current-voltage characteristic curve may also be used for this purpose.

When the circuit is operated in the frequency inverting case, then in addition to the signal frequency and the pump frequency, of all of the frequencies which may be obtained by mixing the signal frequency $f_s$ and the pumping frequency $f_p$, only the difference frequency $f_p-f_s$ is used. This is accomplished by providing the circuit with resonant circuits which are in each case tuned to the appropriate frequencies, see FIGURE 2.

When the circuit is operated in the frequency non-inverting case, then of the many mixed frequencies which are obtained, only the sum frequency $f_p+f_s$ is used. For this purpose, a circuit is provided with appropriately tuned resonant circuits, see FIGURE 2.

A further embodiment of the invention is illustrated in FIGURE 5, which shows an amplifier device including a cascade connection of two parametric or tunnel diode amplifier elements $M_1$ and $M_2$, which may be converters or mixers. One of these is an up-converter, while the other is a down-converter. These two amplifier elements may have either a non-linear susceptance or non-linear real conductance. This embodiment differs from that shown in FIGURES 1 through 4 in that the latter embodiment utilizes mixers which have different types of non-linear conductance, whereas in this embodiment, converters of the same type are utilized. These non-linear elements are indicated as $D_1$ and $D_2$ in FIGURES 5 through 7. The susceptance may be provided by a capacitance diode for example, since this has a non-linear charge-voltage characteristic curve. It is also possible to use a pre-magnetized ferrite body or a current sensitive inductance, since their current-magnetic-flux characteristic curves are also non-linear.

A linear passive and reciprocal coupling network K is provided between the input E and the output A in order to neutralize the reactive admittance of the cascade arrangement $M_1$, $M_2$. Out-of-phase pumping voltages of the frequency $f_p$ are fed to the two amplifier elements, and in the present embodiment this is accomplished by means of a phase shifter P. The two non-linear susceptances or conductances are controlled throughout the entire range by means of these voltages.

When the circuit is operated in the so-called frequency inverting case, then in addition to the signal frequency and the pump frequency, of all of the frequencies which may be obtained by mixing the signal frequency $f_s$ and the pump frequency $f_p$, only the difference frequency $f_p-f_s$ is used. This is accomplished by providing the circuit with resonant circuits which are in each case tuned to the frequency $f_s$ or $f_p$ or $f_p-f_s$, respectively, as shown in FIGURE 6. By this means a complete decoupling between the signal output and the signal input in the reverse direction is possible, while in the forward direction a transducer gain of more than unity is obtainable. By damping the input and output circuits the transducer gain may be reduced to unity, and at the same time a power, or impedance matching may be effected so that the circuit acts as an isolator.

When this circuit is operated in the so-called frequency non-inverting case, then of the many mixed frequencies which are obtained, only the sum frequency $f_p+f_s$ is used. For this purpose, a circuit is provided with appropriate tuned resonant circuits. In the reverse or backward direction a complete decoupling may be obtained with this circuit. Power matching may be obtained because of the positive input and output conductances which appear. The transducer gain is then substantially equal to unity if only small circuit losses are encountered.

When the circuit is operated in the frequency non-inverting case the first converter $M_1$ is an up-converter. If the circuit is used in the frequency inverting case, the first converter is an up-converter only if the frequency $f_p-f_s$ is larged than $f_s$. However, in the event that $f_p-f_s$ is smaller than $f_s$, the first converter is a down-converter.

The addition of coupling network K converts the non-reciprocal characteristic of this circuit with respect to phase, into one exhibiting non-reciprocal behavior with respect to magnitude.

In another embodiment of the invention the non-reciprocal amplifier device of FIGURES 5 and 6 may be enlarged upon to form a non-reciprocal mixer circuit shown in FIGURE 7, by additionally providing a further up-converter or down-converter $M_3$. When the circuit is to be used for television tuners, it is particularly advantageous to use a self-oscillating grounded-grid mixing stage as the third mixer or converter $M_3$. In this case, the oscillating stage then, at the same time, generates the required pumping voltage for the first two converters $M_1$ and $M_2$. The harmonic frequency is derived from the self-oscillating mixing stage $M_3$. By this means the non-linear elements $D_1$ and $D_2$ of the first two converters are modulated. In this case when the circuit is operated in the frequency inverting case the pump frequency must satisfy the following conditions:

$$f_p = f_s + f_i = n \cdot f_O = n(f_s + f_{IF})$$

These symbols denote:

$f_p$=pump frequency
$f_s$=signal frequency
$f_i$=idle frequency
$f_O$=fundamental oscillation of the grounded-grid stage
$f_{IF}$=intermediate frequency of the following stage
$n$=a positive integer.

From this relationship the electrical design, i.e., the components and their values, of the idle circuits of the two parametric or tunnel diode converters $M_1$ and $M_2$ may be derived. These idle circuits must then be tuned to the frequency $f_i = f_s \cdot (n-1) + n \cdot f_{IF}$. Assuming a given signal frequency $f_s$ of 500 megacycles per second and a required intermediate frequency $f_{IF}$ of 50 megacycles per second, and an $n$ value of 3, the result is an idle frequency $f_i$ of 1150 megacycles per second. The pump frequency used is 1650 megacycles per second, and the fundamental oscillation of the self-oscillating grounded-grid mixing stage is 550 megacycles per second.

Instead of the resonant circuits which are normally present at the input and output of the circuit, the real frequency-independent inherent resistances of the generator and the load can also be used directly, as shown in FIGURES 4*a* and 4*b* with respect to the embodiment of FIGURE 1.

It will be understood that the above description of the present invention is susceptible to various modifications, changes and adaptions, and the same are intended to be comprehended within the meaning and range of equivalents of the appended claims.

What is claimed is:

1. A non-reciprocal amplifier circuit arrangement, especially for ultra-high frequency, comprising, in combination:

(a) an up-converter and a down-converter connected in a cascade arrangement and having non-linear elements, said cascade arrangement having an input and an output;

(b) a source of signal voltage for feeding the cascade arrangement and a source of pump voltage for controlling the non-linear elements, one of said converters having an active element which is a non-linear real conductance and the other converter having a non-linear susceptance; and (c) a passive linear and reciprocal coupling network provided between the input and the output of the cascade arrangement for neutralizing the reactive admittance.

2. A non-reciprocal amplifier circuit arrangement as defined in claim 1 and including a further converter connected in cascade with said first-mentioned converters for forming, in combination therewith, a non-reciprocal mixer.

3. A non-reciprocal amplifier circuit arrangement as defined in claim 2, said circuit arrangement including, instead of the resonant circuits of the input E and the output A of the cascade arrangement, the real frequency-independent inherent resistances of the connected generator and load applied directly.

4. A non-reciprocal amplifier circuit arrangement, especially for ultra-high frequency, comprising, in combination:

(a) an up-converter and a down-converter connected in a cascade arrangement and having non-linear elements, said cascade arrangement having an input and an output;

(b) a source of signal voltage for feeding the cascade arrangement and a source of pump voltage for controlling the non-linear elements, one of said converters having an active element which is a non-linear real conductance, and the other converter having a non-linear susceptance; and (c) a passive linear and reciprocal coupling network provided between the input and the output of the cascade arrangement for neutralizing the reactive admittance, said circuit being arranged to operate in the frequency non-inverting case, said pump source providing in-phase pumping voltages to the two converters, said coupling network being an inductance element for providing neutralization.

5. A non-reciprocal amplifier circuit arrangement, especially for ultra-high frequency, comprising, in combination:

(a) an up-converter and a down-converter connected in a cascade arrangement and having non-linear elements, said cascade arrangement having an input and an output;

(b) a source of signal voltage for feeding the cascade arrangement and a source of pump voltage for controlling the non-linear elements, one of said converters having an active element which is a non-linear real conductance, and the other converter having a non-linear susceptance; and (c) a passive linear and reciprocal coupling network provided between the input and the output of the cascade arrangement for neutralizing the reactive admittance, said circuit being arranged to operate in the frequency non-inverting case, said pump source providing out-of-phase pumping voltages to the converters, said coupling network being a capacitance element for providing neutralization.

6. A non-reciprocal amplifier circuit arrangement, especially for ultra-high frequency, comprising, in combination:

(a) an up-converter and a down-converter connected in a cascade arrangement and having non-linear elements, said cascade arrangement having an input and an output;

(b) a source of signal voltage for feeding the cascade arrangement and a source of pump voltage for controlling the non-linear elements, one of said converters having an active element which is a non-linear real conductance and the other converter having a non-linear susceptance; and (c) a passive linear and reciprocal coupling network provided between the input and the output of the cascade arrangement for neutralizing the reactive admittance, said circuit being arranged to operate in the frequency inverting case, said pump source providing in-phase pumping voltages, said coupling network being an inductance element for providing neutralization.

7. A non-reciprocal amplifier circuit arrangement, especially for ultra-high frequency, comprising, in combination:

(a) an up-converter and a down-converter connected in a cascade arrangement and having non-linear elements, said cascade arrangement having an input and an output;

(b) a source of signal voltage for feeding the cascade arrangement and a source of pump voltage for controlling the non-linear elements, one of said converters having an active element which is a non-linear real conductance, and the other converter having a non-linear susceptance; and (c) a passive linear and reciprocal coupling network provided between the input and the output of the cascade arrangement for neutralizing the reactive admittance; said circuit being arranged to operate in the frequency inverting case, said pump source providing out-of-phase pumping voltages, said coupling network being a capacitance element for providing neutralization.

8. A non-reciprocal amplifier device suitable for use as an input circuit for television receivers, comprising, in combination:

(a) two converters connected in cascade and having only one type of non-linear admittance;

(b) means for feeding out-of-phase pumping voltages to said converters;

(c) a linear passive and reciprocal network coupling said converters to neutralize the reactive admittance of the converter cascade; and (d) a further converter connected in cascade with said two converters to form a non-reciprocal mixer circuit, said further converter being a self-oscillating ground-grid mixing stage connected to supply the the pumping voltage for said two converters and thus defining at least a portion of said pumping voltage feeding means.

9. A non-reciprocal amplifier device suitable for use as an input circuit for television receivers, comprising, in combination:

(a) two converters connected in cascade and having only one type of non-linear admittance;

(b) means for feeding out-of-phase pumping voltages to said converters;

(c) a linear passive and reciprocal network coupling said converters to neutralize the reactive admittance of the converter cascade; and (d) a further converter connected in cascade with said two converters to form a non-reciprocal mixer circuit, said further converter being a self-oscillating grounded-grid mixing stage connected to supply the pumping voltage for said two converters and thus defining at least a portion of said pumping voltage feeding means;

(e) said converters being arranged so that the circuit is operated in the frequency inverting case and a harmonic frequency coupled out of the self-oscillating grounded-grid stage serves as the pump frequency, so that the following condition is satisfied:

$$f_p = f_s + f_i = n \cdot f_O = n(f_s + f_{IF})$$

where:

$f_p$=pump frequency
$f_s$=signal frequency
$f_i$=idle frequency
$f_O$=fundamental oscillation of the grounded-grid stage
$f_{IF}$=intermediate frequency of the following stage
$n$=a positive integer.

References Cited by the Examiner

UNITED STATES PATENTS 3,118,113 1/1964 Ferrar et al. ---------- 330—4.5

OTHER REFERENCES

Fisher, "Proceedings of the IRE," July 1960, pages 1227–1232.

Kamal, "Proceedings of the IRE," August 1960, pages 1424–1430.

ROY LAKE, *Primary Examiner.*